Oct. 2, 1956

H. VIETEN 2,765,386

MEANS FOR BONDING THERMOPLASTIC MATERIALS

Filed Feb. 18, 1952

INVENTOR:
HANS VIETEN

BY:

United States Patent Office 2,765,386
Patented Oct. 2, 1956

2,765,386

MEANS FOR BONDING THERMOPLASTIC MATERIALS

Hans Vieten, Alsdorf, near Betzdorf (Sieg), Germany; Elisabeth Vieten, legal representative of said Hans Vieten, deceased Application February 18, 1952, Serial No. 271,996

Claims priority, application Germany November 16, 1951

6 Claims. (Cl. 219—10.53)

This invention relates to improvements in bonding artificial thermoplastic materials, such as polyvinychloride or the like by spot or point welding using high frequency for heating the material to be bonded.

Artificial materials of the kind referred to are usually employed as thin sheets, layers or plies, for instance in the manufacture of articles of clothing. The sheets or layers after being cut to size will be sewed together by means of an ordinary sewing machine, the needle of which by pricking through the layers weaken them so that the seam easily tears out. For this reason, it has been considered to replace the seam by a weld, whereby it is being understood that said artificial material becomes plastic upon heating it to about 300° F. Therefore, the material is heated in any convenient manner and thereupon pressed together with the result that the parts or pieces to be bonded or attached to each other are welded together.

The heating may be accomplished in different manners such as by electric resistance heating or by high frequency currents. In this respect, it is to be noted that I prefer a high frequency heating since high frequency currents create heat in the interior of the material. Accordingly, the surface of the material remains substantially unchanged and thus retains its original appearance.

On the other hand, high frequency welding hitherto required special machines expressly and exclusively constructed and built for this special purpose as described in the U. S. Patents Nos. 2,432,412 and 2,472,820.

It is the main object of my invention to overcome this drawback and to use an ordinary sewing machine for a high frequency welding of artificial materials without any difficulty and even without any need for permanent alteration of the existing sewing machines.

A further object of my invention is to provide an electrode which may be readily arranged on an ordinary sewing machine in place of its needle.

These and other objects of my invention will be more fully explained with reference to the accompanying drawing showing by way of example only a preferred embodiment of the invention.

Figure 1:
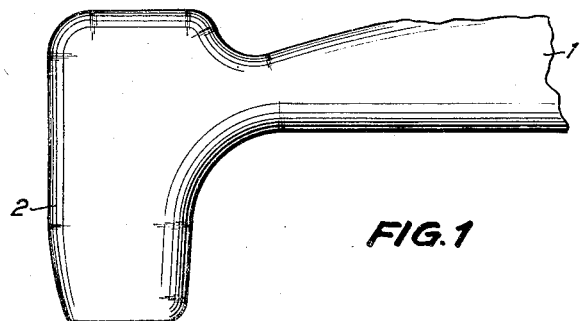
Fig. 1 is a side elevation of a part of an ordinary sewing machine in which the needle is replaced by an electrode in accordance with the invention.
Figure 2:
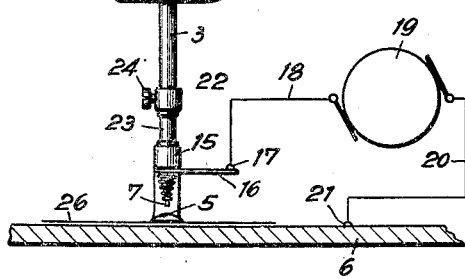
Fig. 2 is a front view of the machine part shown in Fig. 1.

The preferred embodiment shown refers to an ordinary sewing machine the usual hollow frame 1 of which comprises a head 2 and driving means not shown, for imparting a reciprocating movement to a needle rod 3 guided in the head 2 and adapted to hold a needle at its lower end. Beside the needle rod and parallel thereto a pressure rod 4 is shown in Fig. 2, this rod carrying a pressure member or foot member 5 and being arranged in a well known manner in the head 2 so as to be raised or lowered with respect to the base plate 6 of the machine, partly shown in Figs. 1 and 2.

As described so far, the drawing illustrates an ordinary sewing machine. As is usual, such a machine is further provided in the base plate 6, below the foot member 5, with feeding means (not shown) for feeding the material to be bonded during the reciprocating movement of the needle rod 3.

According to the invention, such a machine may easily be altered with a view to using it for a high frequency welding of artificial materials such as polyvinychloride. To this end, it suffices according to the invention, to remove the needle from its rod 3 and to mount thereon an electrode to be connected to one pole of any convenient high frequency alternator the other pole of which is to be connected to the machine plate 6 for receiving the sheets or layers to be attached by welding in the same manner as any cloth to be sewed.

Figure 3:
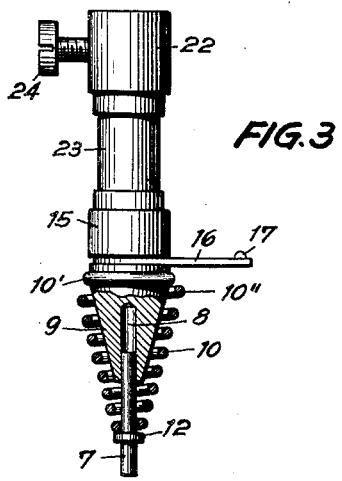
Fig. 3 is a side view partly in section of the interchangeable electrode arrangement drawn to a larger scale.

As will be seen from Fig. 3, the electrode comprises a pin 7 moveably arranged in an axial bore 8 of a guiding member 9 having a cone like shape in the embodiment shown. A helically wound spring 10 surrounding said cone member is fastened at its lower end to the pin 7 as by soldering, and at its upper end to the cone member 9, the upper winding 10' of the spring, having a diameter somewhat smaller than that of the adjacent winding 10'', engages an annular groove 11 in the cone member 9. Furthermore, the pin 7 is provided with an annular collar 12 arranged directly below the spring for supporting it upon its compression.

The guiding cone member 9 has at its upper end a screw threaded nipple 13 (see Fig. 4) engaging a screw threaded bore 14 in a socket or sleeve 15, to clamp a connection plate 16 between the member 9 and the socket 15. The plate 16 carries a terminal 17 connected by a wire 18 to one pole of a high frequency alternator 19, only symbolically represented in Fig. 1 since it is self-evident that the details of the alternator are not essential for the subject matter of the invention. In this respect it will be observed that a thermionic generator of small power of about 50 to 200 watt may be employed. In the event of greater power requirements, I prefer to provide a control device for adjusting the heating energy with a view to prevent overheating of the material to be heated.

As mentioned above, a second wire 20 connects the alternator to a terminal 21 provided on the base plate 6 of the sewing machine.

Figure 4:
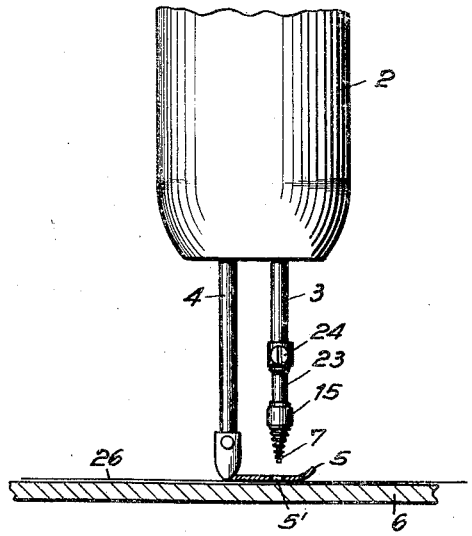
Fig. 4 is a cross-sectional view of the electrode holding means.
Figure 4:
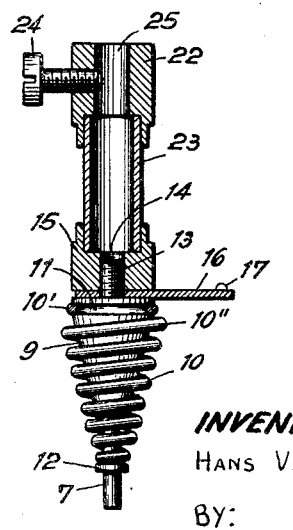

In view of the fact that the socket 15 is connected to the electric current source, it cannot be directly arranged on the lower end of the needle rod 3. Accordingly, a particular clamping sleeve 22 and an intermediate insulating member 23 are provided as holding means for the electrode, said insulating member is shown in Fig. 4 being, for instance, a tube of ceramic material, and member 23 is fastened at its lower end to the socket 15 and at its upper end to the clamping sleeve 22. A locking screw 24 screwed in a bore 25 of the sleeve 22 is provided so that the sleeve may be placed on the lower end of the needle rod 3 and then fastened thereto by tightening said screw 24.

The electrode according to the present invention operates as follows:

In the upper position of the rod 3 the spring 10 is released so that merely the upper end of the pin 7 remains in the guiding member 9. Upon a downward stroke of the rod 3 the pin 7 passes through a hole 5' in the foot member 5 (see Fig. 2) and then comes into contact with the material to be bonded shown at 26 in Figs.

1 and 2. The further downward movement of the rod 3 causes a compression of the spring and an entering of the pin 7 into the bore 8 of the guiding member 9 thereby ensuring a positive guiding action of the pin. As soon as the rod 3 arrives in its lower position the welding operation is finished. In this position the spring windings contact each other and are thus short crcuited. Upon the following raising movement of the rod 3 the spring 10 begins to expand and the upper end of the pin 7 slides back in the bore 8 up to the upper stroke position of rod 3.

Then, the next stroke begins, each stroke repeating the operation described and producing one welding point. During the reciprocating movement of the electrode pin 7 the feeding means mentioned above feed the material 26 to be bonded in the same manner as in an ordinary sewing machine so that the successive welding points form a seam similar to the seam produced by a needle and a thread.

As experience has taught, the strength of the seam thus produced is greater than that of a single sheet or layer. Due to the fact that the active lower end of the electrode pin 7 produces impressions in the material 26 in accordance with the cross-section of said active end, the electrode may simultaneously be employed for producing ornaments and the like of any kind. Of course, the new electrode is likewise adapted for impressing ornaments without a welding and bonding operation.

In distinction from the bonding machines disclosed in the U. S. patents referred to above, the new electrode according to the present invention permits in very simple manner an alternative use of an ordinary sewing machine for sewing and point welding. As will be readily understood, a replacing of the usual needle by the electrode and vice versa is possible in a few minutes. In this respect, it will be observed, that a permanent alteration of the machine is not necessary for this purpose. For the period in which the machine is used for sewing the generator mounted in a casing may be employed for any other purposes, as for instance for another welding job or for a high frequency furnace.

With regard to the spring 10 it may be pointed out that in case of a metallic spring its inductivity is of interest in view of the small wave lengths of the high frequency applied for the bonding operation. During the welding operation, the spring will be alternately compressed and expanded resulting in a repeated alteration of its inductivity. This influences the oscillating circuit comprising the spring. It is possible to utilize this crcumstance in such a manner that the oscillatory circuit, upon compression of the spring comes out of resonance and thus ensures a small energy reception from the generator, whereby the material 26 will be protected against overheating at the end of the welding stroke.

According to the invention, however, it has been found that the inductivity alteration of the spring is not necessary to obtain the effect mentioned above. This effect, if desired, may also be obtained by other means, as for instance by the structure of the high frequency alternator.

The new spring electrode according to the present invention is an important advance in the art due to the fact that (1) one and the same machine may be employed alternately for sewing and point welding, the alteration being possible for any layman in a very simple manner and in a few minutes only, (2) the windings of the spring will be short circuited so that the current carried by the spring is small or zero and, therefore, the spring does not carry any additional electric load, (3) the electrode pin 7 secured to the spring cannot yield laterally due to its vertical guide so that short circuits from the pin to the foot member 5 are prevented.

In case an electric short circuit of the spring is not desired, but only an inductivity alteration is desired, the guiding member 9 or the upper end portion of the pin 7 may be made wholly or partially of insulating material.

In this instance, care must be taken that the lower portion of the pin 7 is connected to the plate 16 by a metallic connection or by an electric condenser arranged between the plate 16 and the winding 10' of the spring 10.

Of course, the invention is not limited to the special example illustrated, many modifications thereof as well as other embodiments being possible within the scope of the invention. In this respect reference is for instance made to the several possibilities stated above. Moreover, it is not indispensable that all features of the present invention be used jointly since they may be employed advantageously in various combinations and subcombinations.

What I claim is:

1. For use with a sewing machine including a reciprocated needle rod, metal supporting means, and feeding means mounted in said metal supporting means opposite said reciprocated needle rod, a welding attachment, comprising in combination, a source of high frequency current having two terminals, one of said terminals being electrically connectable to the metal supporting means; at least one electrode means having a blunt free end and being electrically connected to the other of said terminals; and attaching means for securing the other end of said electrode means to the reciprocated needle rod for reciprocation therewith, and including insulating means insulating said electrode means from the needle rod so that superimposed thermoplastic sheets located on the supporting means and fed by the feeding means are intermittently heated by a high-frequency electric field, and bonded between said blunt free end of said electrode means and the supporting means, said thermoplastic sheets constituting the dielectric of a condensor formed by said electrode means and the supporting means.

2. For use with a sewing machine including a reciprocated needle rod, metal supporting means, and feeding means mounted in said metal supporting means opposite said reciprocated needle rod, a welding attachment, comprising, in combination, a source of high frequency current having two terminals, one of said terminals being electrically connectable to the metal supporting means; at least one electrode means having a blunt free end and being electrically connected to the other of said terminals, said electrode means being resiliently compressible; and attaching means for securing the other end of said electrode means to the reciprocated needle rod for reciprocation therewith, and including insulating means insulating said electrode means from the needle rod so that superimposed thermoplastic sheets located on the supporting means and fed by the feeding means are intermittently heated and bonded between said blunt free end of said electrode means and the supporting means, said thermoplastic sheets constituting the dielectric of a condensor formed by said electrode means and the supporting means.

3. For use with a sewing machine including a reciprocated needle rod, metal supporting means, and feeding means mounted in said metal supporting means opposite said reciprocated needle rod, a welding attachment, comprising, in combination, a source of high frequency current having two terminals, one of said terminals being electrically connectable to the metal supporting means; at least one electrode means including an intermediate supporting member, an electrode slidably mounted on said intermediate supporting member, and resilient means abutting at one end thereof against said intermediate supporting member and at the other end thereof on said electrode, said electrode having a blunt free end and being electrically connected to the other of said terminals; and attaching means for detachably securing said intermediate supporting member to the reciprocated needle rod for reciprocation therewith, and including insulating means insulating said intermediate supporting member from the needle rod so that superimposed thermoplastic sheets located on the supporting means and fed by the feeding means are intermittently heated and bonded between said blunt free end of said electrode and the supporting means, said thermoplastic sheets constituting the dielectric of a condensor formed by said electrode and the supporting means.

4. For use with a sewing machine including a reciprocated needle rod, metal supporting means, and feeding means mounted in said metal supporting means opposite said reciprocated needle rod, a welding attachment, comprising, in combination, a source of high frequency current having two terminals, one of said terminals being electrically connectable to the metal supporting means; at least one electrode means including an intermediate supporting member, an electrode slidably mounted on said intermediate supporting member, and resilient means abutting at one end thereof against said intermediate supporting member and at the other end thereof on said electrode, said electrode including an intermediate supporting member formed with a bore, an electrode slidably mounted in said bore of said intermediate supporting member, and a coil spring abutting at one end thereof against said intermediate supporting member and at the other end thereof against said electrode, said electrode having a blunt free end projecting out of said bore, said electrode being electrically connected to the other of said terminals; and attaching means for detachably securing said intermediate supporting means to the reciprocated needle rod for reciprocation therewith, and including insulating means insulating said intermediate supporting member from the needle rod so that superimposed thermoplastic sheets located on the supporting means and fed by the feeding means are intermittently heated and bonded between said blunt free end of said electrode and the supporting means, said thermoplastic sheets constituting the dielectric of a condensor formed by said electrode and the supporting means.

5. For use with a sewing machine including a reciprocated needle rod, metal supporting means, and feeding means mounted in said metal supporting means opposite said reciprocated needle rod, a welding attachment, comprising, in combination, a source of high frequency current having two terminals, one of said terminals being electrically connectable to the metal supporting means; attaching means including two end members and an intermediate insulating member secured to said end members; clamping means on one of said end members for detachably clamping said attaching means to the needle rod, the other of said end members being formed with an inner thread; an intermediate supporting member having at one end thereof a threaded portion screwed into said inner thread of said supporting member, and being formed at the other end thereof with a bore; a contact member clamped between said other end member and said intermediate supporting member so as to be electrically connected to the latter, said contact member being electrically connected to the other of said terminals; an electrode pin slidably mounted in said bore of said intermediate supporting member, and having a free blunt end projecting out of said bore; and a conical helicoidal spring secured at the wider end thereof to said intermediate supporting member, and at the smaller end thereof to said electrode pin so as to urge the latter out of said bore so that superimposed thermoplastic sheets located on the supporting means and fed by the feeding means are intermittently heated and bonded between said blunt free end of said electrode pin and the supporting means, said thermoplastic sheets constituting the dielectric of a condenser formed by said electrode pin and the supporting means.

6. For use with a sewing machine including a reciprocated needle rod, metal supporting means, and feeding means mounted in said metal supporting means opposite said reciprocated needle rod, a welding attachment, comprising, in combination, a source of high frequency current having two terminals, one of said terminals being electrically connectable to the metal supporting means; at least one electrode means having a blunt free end having a cross-section adapted to form an ornamental imprint, said electrode means being electrically connected to the other of said terminals, said electrode means being resiliently compressible; and attaching means for securing the other end of said electrode means to the reciprocated needle rod for reciprocation therewith, and including insulating means insulating said electrode means from the needle rod so that superimposed thermoplastic sheets located on the supporting means and fed by the feeding means are intermittently heated and bonded between said blunt free end of said electrode means and the supporting means, said thermoplastic sheets constituting the dielectric of a condensor formed by said electrode means and the supporting means.

References Cited in the file of this patent

UNITED STATES PATENTS

| | | |
|---|---|---|
| 2,322,298 | Johnston | June 22, 1943 |
| 2,459,260 | Brown | Jan. 18, 1949 |
| 2,477,040 | Brown et al. | July 26, 1949 |
| 2,478,857 | Brown et al. | Aug. 9, 1949 |
| 2,555,409 | Hosfield | June 5, 1951 |